United States Patent
Hillel et al.

(10) Patent No.: US 9,739,207 B2
(45) Date of Patent: Aug. 22, 2017

(54) AIRCRAFT VAPOUR TRAIL CONTROL SYSTEM

(71) Applicant: ROLLS-ROYCE PLC, London (GB)

(72) Inventors: Malcolm Hillel, Derby (GB); Peter Swann, Nottingham (GB); Andrew Martin Rolt, Derby (GB); Paul Fletcher, Rubgy (GB)

(73) Assignee: ROLLS-ROYCE plc, London (GB)

( * ) Notice: Subject to any disclaimer, the term of this patent is extended or adjusted under 35 U.S.C. 154(b) by 166 days.

(21) Appl. No.: 14/644,799

(22) Filed: Mar. 11, 2015

(65) Prior Publication Data
US 2015/0285158 A1    Oct. 8, 2015

(30) Foreign Application Priority Data

Apr. 2, 2014 (GB) .................................. 1405897.8

(51) Int. Cl.
*F02C 9/20* (2006.01)
*B64D 33/04* (2006.01)
(Continued)

(52) U.S. Cl.
CPC ............... *F02C 9/20* (2013.01); *B64D 31/06* (2013.01); *B64D 33/04* (2013.01); *F02K 1/1207* (2013.01); *F02K 1/76* (2013.01); *F02K 1/16* (2013.01); *F02K 3/075* (2013.01); *F05D 2220/323* (2013.01); *F05D 2270/08* (2013.01); *F05D 2270/311* (2013.01); *F05D 2270/312* (2013.01);
(Continued)

(58) Field of Classification Search
None
See application file for complete search history.

(56) References Cited

U.S. PATENT DOCUMENTS 5,285,256 A * 2/1994 Nelson .................... G01C 3/00
356/342
8,406,465 B1 * 3/2013 Garrett .................... G06K 9/00
382/103
(Continued)

FOREIGN PATENT DOCUMENTS

CN    103047010 A    4/2013
EP    2 184 480 A2    5/2010
(Continued)

OTHER PUBLICATIONS

Fredrik Haglind, "Potential of lowering the contrail formation of aircraft exhausts by engine re-design", Dec. 23, 2007, Aerospace Science and Technology 12 (2008) 490-497.*
(Continued)

*Primary Examiner* — Ehud Gartenberg
*Assistant Examiner* — Daniel Arble
(74) *Attorney, Agent, or Firm* — Oliff PLC

(57) ABSTRACT

The invention concerns an aircraft propulsion control system in which a gas turbine engine has an actuable flow opening for control of flow to or from a portion of the engine. One or more sensor is arranged to sense a condition indicative of vapor trail formation by the exhaust flow from the engine. A controller is arranged to control actuation of the flow opening so as to reduce the efficiency of the engine upon sensing of said condition by the one or more sensor. In one example, the flow opening is a variable area fan nozzle.

9 Claims, 4 Drawing Sheets

(51) Int. Cl.
　　　*B64D 31/06*　　(2006.01)
　　　*F02K 1/76*　　(2006.01)
　　　*F02K 1/12*　　(2006.01)
　　　F02K 1/16　　(2006.01)
　　　F02K 3/075　　(2006.01)

(52) U.S. Cl.
　　　CPC ....... *F05D 2270/313* (2013.01); *Y02T 50/677* (2013.01)

(56) References Cited

U.S. PATENT DOCUMENTS

| | | | | |
|---|---|---|---|---|
| 2009/0090817 | A1* | 4/2009 | Monka | F02K 1/1223 244/76 R |
| 2009/0320488 | A1* | 12/2009 | Gilson | F02K 1/002 60/771 |
| 2010/0107600 | A1* | 5/2010 | Hillel | F01D 17/08 60/235 |
| 2010/0126178 | A1* | 5/2010 | Hyde | B64D 27/24 60/767 |
| 2011/0289900 | A1* | 12/2011 | Stern | F02K 1/09 60/226.2 |
| 2013/0192241 | A1 | 8/2013 | Blackwell et al. | |

FOREIGN PATENT DOCUMENTS

| | | |
|---|---|---|
| EP | 2 685 280 A2 | 1/2014 |
| WO | 2008/145954 A2 | 12/2008 |

OTHER PUBLICATIONS

Oct. 28, 2014 Search Report issued in British Application No. 1405897.8.

* cited by examiner

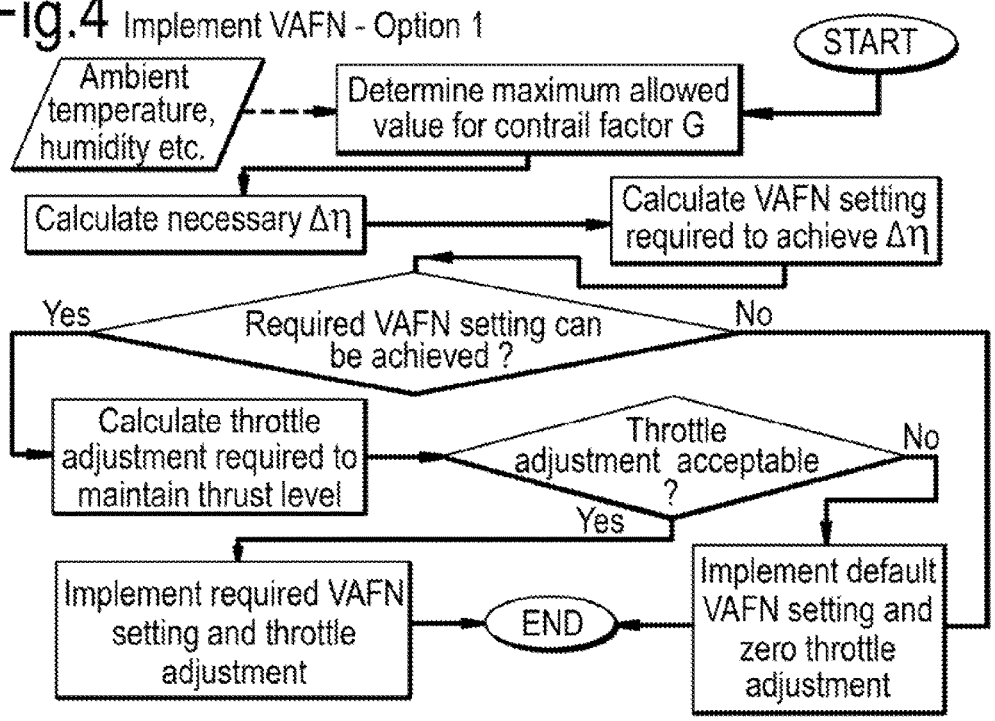
Fig.4 Implement VAFN - Option 1
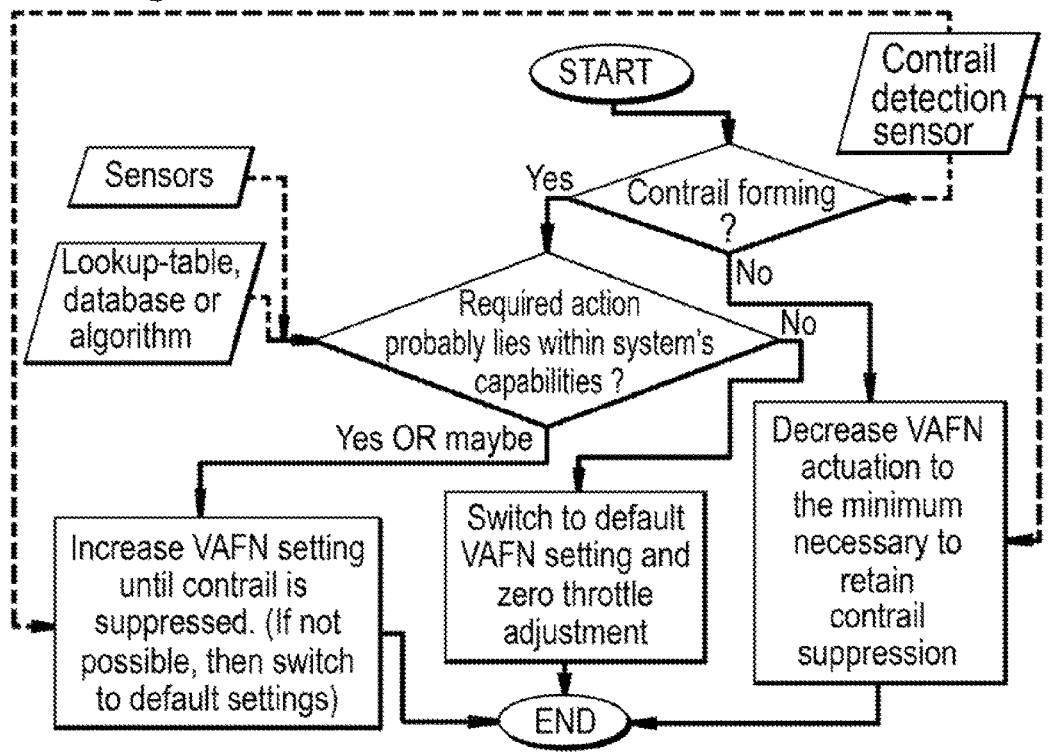
Fig.5 Implement VAFN Option 2

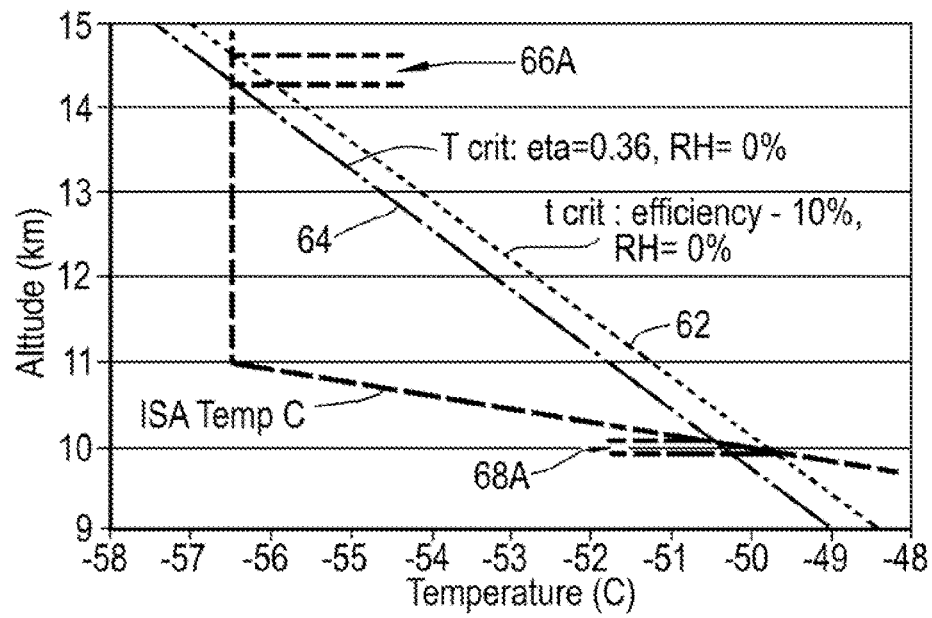
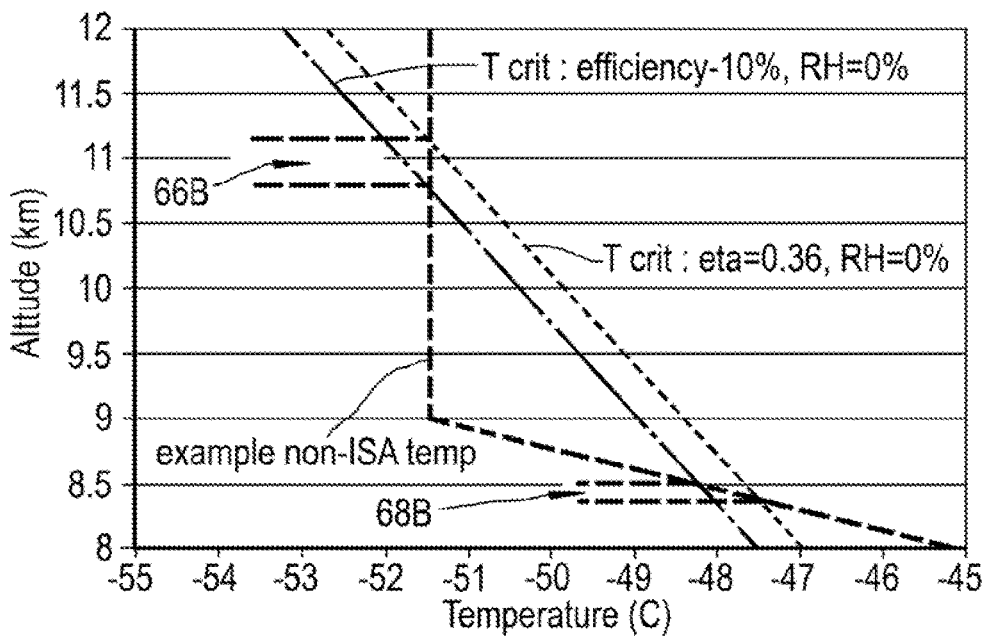

AIRCRAFT VAPOUR TRAIL CONTROL SYSTEM

BACKGROUND OF THE INVENTION

The present invention relates to aircraft propulsion systems, and more particularly to control systems for aiding the prevention of the formation of contrails.

Contrails, also known as condensation trails or vapour trails, are line-shaped ice-clouds that appear behind aircraft under certain circumstances. The formation of a contrail depends on a number of factors, including: ambient temperature, humidity and pressure; the efficiency of the aircraft's engines; and the properties of the fuel burned in the engines.

The term "contrail factor" is used herein to refer to the gradient of a line representing the mixing of engine exhaust air with ambient air, when plotted on a chart using water-vapour partial pressure as the y-axis and temperature as the x-axis. A reduction in an engine's contrail factor reduces the range of ambient conditions under which the engine can form a contrail. Alternatively, at a particular ambient condition (characterised by pressure, temperature and humidity), a reduction in contrail factor may allow a transition from formation of a contrail to non-formation of a contrail.

A contrail, once formed, will typically dissipate within a minute or so, unless the ambient air is supersaturated with respect to ice, in which case the contrail may persist. A persistent contrail may grow over time to resemble natural cirrus cloud, both in size and optical properties, and is then referred to as "contrail-cirrus". Line-shaped contrails and contrail-cirrus are collectively referred to as "aviation-induced cloudiness" (AIC). Contrail-cirrus is thought to cause a majority of the negative climate impact of AIC due to it being spatially-larger and longer-lived relative to a non-persistent line-shaped contrail.

Depending on the metric employed, the climate-warming impact of aviation-induced cloudiness may be of a similar magnitude to that of the carbon dioxide ($CO_2$) emitted by aircraft, and may therefore represent a significant element of aviation's total climate impact. The suppression of contrail formation, and particularly the suppression of persistent contrails, may represent an opportunity for a significant reduction in the overall climate warming impact of aviation.

However a number of potential techniques for reduction of contrail formation by a gas turbine engine require the use of bespoke equipment and/or materials that are additional to those required for conventional engine operation. Any weight and/or energy penalties incurred in order to achieve contrail suppression require careful scrutiny to determine whether such penalties outweigh the possible contrail reduction benefits on climate impact.

Another method of potentially reducing the negative impact of contrail formation is to route aircraft around/above/below regions of air susceptible to contrail formation and/or persistence. However, in addition to the added complexity for air traffic control and pilots, the re-routing of aircraft away from predetermined flight paths may cause increased fuel burn, not only by increasing duration and distance travelled, but also by causing departure from optimal cruise conditions of the aircraft engines.

It is therefore an object of the present invention to manage the formation of contrails by aircraft engines in a manner that reduces negative impact on the climate. It may be considered an additional or alternative aim to provide a system for aircraft engine contrail suppression which bears minimal weight or material penalty.

BRIEF SUMMARY OF THE INVENTION

According to a first aspect of the invention there is provided an aircraft propulsion control system comprising: a gas turbine engine having an actuable flow opening for control of flow to or from a portion of the engine; one or more sensor arranged to sense a condition indicative of vapour trail formation by the exhaust flow from the engine; and a controller arranged to control actuation of the flow opening so as to reduce the efficiency of the engine upon sensing of said condition by the one or more sensor.

The flow opening may comprise one or more actuable member arranged selectively to vary the flow area of the flow opening. The controller may vary the angle/orientation of the actuable member relative to the direction of flow through the opening (e.g. relative to an engine axis). The actuable member may be pivotably mounted/actuable relative to the opening.

The flow opening may comprise a nozzle, e.g. to redirect and/or accelerate flow in normal/conventional use. The flow opening may comprise an annular opening. The flow opening may be arranged to control flow to/from a compressor portion of the engine. The compressor may comprise a fan.

The flow opening may comprise an exhaust nozzle.

The flow opening may be located downstream of a fan. The flow opening may be located for example within the flow along a bypass duct of the engine. A variable area fan nozzle may be provided.

The invention beneficially allows the efficiency of the engine to be reduced in order to influence the instantaneous contrail factor for the engine. The flow opening may be actuable to decrease engine efficiency by altering the fan pressure ratio and/or the engine bypass ratio and as a result the efficiency of the fan and hence the efficiency of the engine as a whole.

The controller may be arranged to alter one or more further operational variable for the engine to compensate for the reduced engine efficiency, for example so as to maintain a desired level of thrust for the engine. The controller may receive a thrust setting for the engine, e.g. as a data input. The one or more further operational variable may comprise a throttle setting for the engine. The controller may be arranged to alter the one or more further operational variable concurrently with the actuation of the flow opening.

The controller may be arranged to compare the minimum available efficiency value by varying the flow opening with an efficiency value required to prevent contrail formation. The controller may be arranged to reduce the engine efficiency only if it is determined that contrail suppression can be achieved thereby. Although engine efficiency exerts a relatively weak effect on contrail formation, it has been found that in some situations it will beneficially provide sufficient control to enable an aircraft to remain contrail-free at its current/desired flight-level whilst traversing a region of ice-supersaturated air, rather than needing to climb a full 1000 ft or 2000 ft to the next available flight-level, which may correspond to a materially less fuel-efficient cruising altitude. Thus the invention may beneficially allow other aspects of engine operation and/or flight path to be uncompromised.

The sensor may comprise one or more sensor for detecting actual or implied contrail formation. The sensor may or may not comprise one or more ambient condition sensor. The sensor may or may not comprise an engine operating condition sensor. The sensor may or may not comprise a contrail detection sensor, such as, for example an optical depth or acoustic sensor (e.g. a wave emitter/receiver).

The sensor may comprise one or more of an ambient temperature, pressure and/or humidity sensor. The sensor may or may not comprise an altitude sensor. One or more threshold value of a sensor reading may be used to control initiation/cessation of the flow opening actuation. The controller may be arranged to actuate the variable flow opening only in response to detected or implied contrail formation in a region of ice-super-saturated air.

The variable flow opening may have a first setting or flow area for a first, or normal, usage condition. The flow opening may be adjusted away from the first setting or flow area in a second, or actuated, condition of use for contrail mitigation. The flow opening may be actuated in a third mode of use. The flow opening may be actuated for control of one or more further operational variable for the engine. The flow opening may be actuated for noise suppression, and/or for avoidance of fan flutter.

Different uses of the variable flow opening may be controlled at different portions or phases of a flight, which may be distinguished for example based on location (altitude or geographical location) and/or one or more engine operating conditions.

In examples of the invention, the controller may be arranged to receive a signal indicative of the level/volume of fuel aboard the aircraft. The system may comprise one or more fuel sensor. The controller may be arranged to determine whether or not to actuate the flow opening, and/or the degree of actuation, based at least in part upon the fuel level/volume signal. The controller may initiate or cease actuation of the flow opening in dependence upon said signal. A fuel threshold may be determined, for example dynamically, by the controller and may take account of a fuel requirement for completion of a remainder of a flight.

The controller typically comprises machine readable instructions, such as one or more module of code and/or control algorithm, for control of flow opening actuation with the aim of suppressing contrail formation from the engine.

According to a second aspect of the invention, there is provided a data carrier comprising machine readable instructions for operation of a controller of an engine control system in accordance with the first aspect. The data carrier may comprise a persistent memory or data carrier device.

According to a third aspect of the invention, there is provided a method of controlling one or more aircraft engine in accordance with the control system of the first aspect.

Any of the preferable features defined above in relation to the first aspect may be applied to the second or third aspect.

BRIEF DESCRIPTION OF THE DRAWINGS

Practicable embodiments of the invention are described in further detail below by way of example only with reference to the accompanying drawings, of which:

FIG. 4 is a flow diagram of a control process for contrail mitigation according to a first example of the invention;

FIG. 5 is a flow diagram of a control process for contrail mitigation according to a second example of the invention; and FIGS. 6A and 6B show plots of altitude against critical temperatures at which contrails will form.

DETAILED DESCRIPTION OF THE INVENTION

In essence this invention achieves a contrail suppression effect by selectively altering the total efficiency of the engine, thus decreasing the threshold ambient temperature below which a contrail can form, at a given level of ambient humidity. That is to say, when contrail suppression is operative, the contrail formation requires colder ambient air and so takes place under a smaller range of circumstances.

Variable area fan nozzles (VAFNs) have been previously considered for managing fan flutter and for reducing noise, for example as described in European Patent Application 09252067.5 (published as EP2184480), in the name of Rolls-Royce plc. In prior art applications, the VAFN is opened to avoid flutter during the take-off roll, and opened to reduce jet and fan noise just after take-off whilst overflying noise sensitive communities. In contrast, examples of the invention described below propose the use of a VAFN to implement a reduction in engine total efficiency in order to suppress contrail formation in certain operating conditions.

Figure 1:
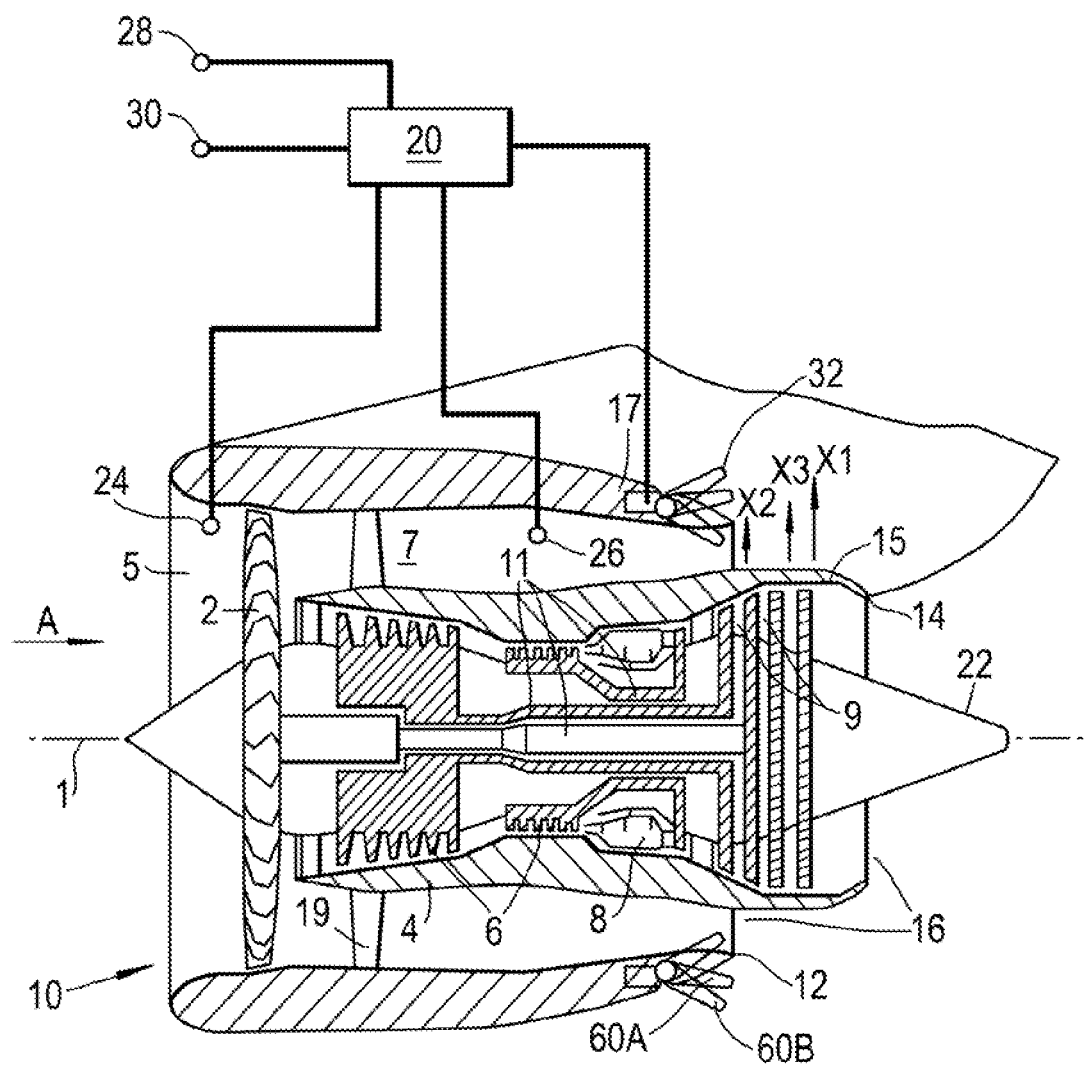
FIG. 1 shows a longitudinal section through an aircraft engine according to an example of the invention.

Turning to FIG. 1, there is shown an example of a turbofan gas turbine engine 10 and controller arrangement according to the invention. Although the diagram depicts a "three-shaft" turbofan gas turbine engine, it is to be understood that the present invention is applicable to turbofan gas turbine engines with any number of shafts. Furthermore, although the diagram depicts a conventional turbofan arrangement it is to be understood that the present invention is equally applicable to a geared turbofan arrangement in which the fan is driven by a turbine via a reduction gear. The engine 10 comprises in axial flow series an air intake 5, a propulsive fan 2, a core engine 4 and an exhaust nozzle assembly 16 all disposed coaxially about an engine axis 1. The core engine 4 comprises in axial flow series a series of compressors 6, a combustor 8 and a series of turbines 9. The direction of airflow through the turbofan gas turbine engine 10 in operation is indicated by arrow A and the terms upstream and downstream are used with reference to this general flow direction. Air is drawn through the air intake 5 and is compressed by the fan 2. The airflow from the fan 2 is split between a flow through the core engine 4 and a bypass flow. The flow through the core engine 4 flows through the compressors 6 where it is further compressed and into the combustor 8 where it is mixed with fuel and the fuel is burnt in the air in the combustor 8. The combustion of the fuel in the compressed air in the combustor 8 produces hot gases, which exit the combustor 8 and flow downstream through and drive the turbines 9. The turbines 9 drive the compressors 6 and fan 2 via shafts 11 which drivingly connect the turbines 9 with the compressors 6 and the fan 2.

The exhaust gases leaving the turbines 9 flow through the exhaust nozzle assembly 16 to provide propulsive thrust. The remainder of the air from the fan 2, the bypass flow, flows within a bypass duct 7 around the core engine 4. The bypass flow, which has been accelerated by the fan 2 also flows to the exhaust nozzle assembly 16 where it is exhausted, as a bypass exhaust stream to provide further propulsive thrust, typically the majority of the overall thrust produced by the engine. The velocity of the bypass exhaust stream is significantly lower than the velocity of the core engine exhaust stream.

The exhaust nozzle assembly 16 comprises two concentric exhaust nozzles, a radially outer bypass, or fan, exhaust nozzle 12 and a radially inner core exhaust nozzle 14. The core exhaust nozzle 14 is defined at its radially outer extent by a generally frusto-conical core nozzle wall 15 and at its radially inner extent by a frusto-conical engine plug structure 22. The bypass, or fan, exhaust nozzle 12 is defined at its radially outer extent by a nacelle, or fan casing, 17 and at its radially inner extent by the core nozzle wall 15.

The bypass, or fan, exhaust nozzle 12 is a variable area fan exhaust nozzle. The bypass duct 7 is also defined at its radially outer extent by the nacelle, or casing, 17, which is generally annular and arranged coaxial with the engine axis 1. Thus the nacelle, or fan casing, 17 defines a flow passage through the turbofan gas turbine engine 10. The bypass, or fan, variable area exhaust nozzle 12 is arranged at the downstream end of the nacelle 17.

The turbofan gas turbine engine 10 has a plurality of engine operation sensors shown schematically at 24 and 26. The sensor examples 24 and 26 may be arranged to measure pressure at the intake 5 (i.e. upstream of the fan 2) and also the total pressure in the bypass duct 7, thereby allowing determination of the power produced by the engine 10. However this provides just one example of an engine operation sensor arrangement and there are many additional or alternative engine sensor arrangements that may be used in conjunction with the invention as will be described below.

The controller 20 is also arranged to receive signals of sensed parameters from externally of the engine 10, such as from one or more ambient condition sensor 28 and/or a contrail detection sensor 30. The ambient sensor 28 comprises a plurality of sensors for measuring altitude (e.g. ambient pressure), temperature and/or humidity. The contrail detection sensor in this example comprises an optical depth sensor having a field of view downstream of the engine exhaust (i.e. to detect formation of contrails aft of the engine). Alternative contrail detection sensors could be used, such as an acoustic transmitter/receiver. Any of the external sensors 28, 30 may be mounted on the aircraft body or wing.

A controller 20 is arranged to receive signals of sensed parameters in use from the engine operation and other sensors. The sensors 24-30 supply signals/measurements to a controller 20 via connecting leads or else a local wireless network.

The controller 20 is typically a general engine controller, i.e. arranged to control numerous aspects of engine operation in addition to the contrail mitigation system described herein. Accordingly it will be appreciated that such a controller will typically receive inputs from a significant number of other sensors. However one or more bespoke control algorithm (e.g. one or more module of code) will control operation of the controller as a contrail mitigation controller in accordance with the invention. Such functionality dictates which engine operation variables are available for control in accordance with the contrail mitigation strategy. The controller will also determine what scope of control is available for the purpose of contrail mitigation based upon other engine operation requirements that must be prioritized above contrail mitigation needs.

An actuator 32 is arranged to vary the cross sectional area of a portion of the bypass duct 7. In this example, the actuator 32 is arranged at the downstream end of the bypass duct 7 so as to provide a variable area fan exhaust nozzle arrangement 12. The controller 20 is arranged to configure the cross-sectional area of the variable area fan exhaust nozzle 12 at different cross-sectional areas in different modes of operation by sending corresponding control signals to the actuator 32. The actuator 32 may be a mechanical, hydraulic, pneumatic, electrical or other suitable actuator.

Figure 2:
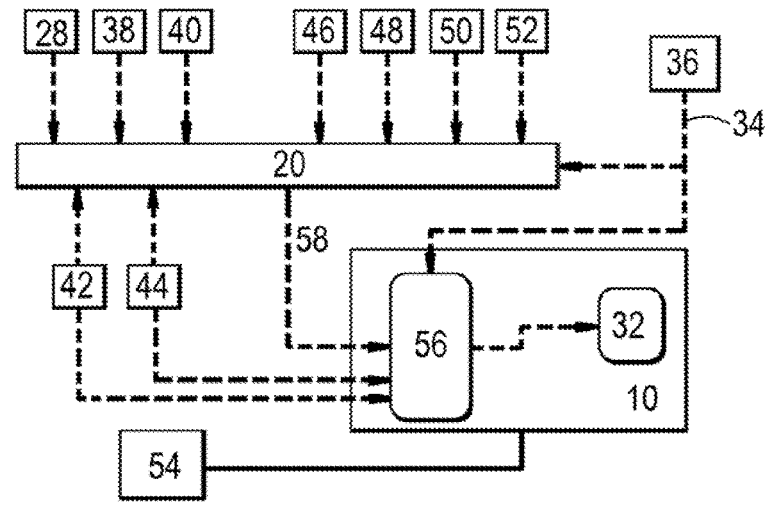
FIG. 2 is a diagrammatic representation of a control system according to an example of the invention.

Turning to FIG. 2, there is shown one arrangement of a control system according to the invention, in which the dashed lines indicate signals between the relevant system components.

Signal 34 is a signal representative of an engine-throttle-setting and/or thrust-requirement setting commanded, whether by human pilot or by autopilot, from a cockpit 36 of the aircraft.

Ambient condition sensors 28 are as described above and are arranged to output real-time or near-real-time information concerning the ambient pressure, ambient temperature and ambient humidity of air through which the aircraft is flying. In another example, one or more of those sensors 28 may optionally be replaced and/or supplemented by a database of forecast data (e.g. obtained prior to the flight and/or updated periodically during the flight via radio-link or similar) which details the ambient condition(s) that the flight will encounter along its proposed flight routing and altitude profile, taking account of the expected time at which each point of the proposed route will be passed.

38 is a representation of a deployment policy or contrail suppression policy. The policy allows prioritisation of the control system to achieve greatest beneficial climate impact. That is to say the policy determines how best the invention should be employed to ensure that any increased fuel burn due to reduction of engine efficiency is outweighed by the beneficial impact of contrail suppression/mitigation. The policy can be implemented by one or more routine or calculation to assess whether or not to attempt contrail suppression according to either or both of:

An assessment of the likely climate warming impact of the contrail if it is allowed to form An assessment of any cost penalty associated with allowing the contrail to form The assessment of climate warming impact would primarily take into account one or more of the following factors:

Will the contrail persist?

Over the contrail's lifetime/persistence, what is the balance between day-time and night-time?

What is the temperature of the ambient air in which the contrail will reside?

Using answers to the above three questions, a decision on whether or not to deploy the invention in an effort to suppress the contrail's formation can be taken. Based on the above, there are a number of options for a deployment-policy, which can be used in isolation or combination to inform a contrail suppression decision:

a) Estimate a climate warming impact of the contrail if allowed to form, and apply a threshold below which contrail-suppression will not be attempted b) As a) but assessing the reduction in climate warming impact that can be achieved by this invention per extra unit mass/weight/volume of fuel burned.

c) As b) but assessing the contrail-related benefit due to the reduction in warming impact against a corresponding threshold/margin, which could be tailored according to the aircraft operator's view d) Alternatively, employ one or more pre-determined deployment rule based on a contrail characteristic or ambient condition, e.g. to act against persistent night-time contrails only.

During the day, contrails reflect a proportion of incoming sunlight away, leading to a climate cooling effect which is at least partially offset against the climate-warming impact associated with the absorption by contrails of heat radiating upward from the planet's surface. During the night, however, the cooling effect is not operative. For this reason a contrail's climate warming impact (per unit time of contrail existence) is typically greater during the night than during the day. It is estimated that, globally, night-time flying accounts for some 40% of total flying miles, but for some 60% of aviation's total contrail-related climate warming impact. The climate warming impact of a contrail is also influenced by its temperature such that a contrail forming in colder air will exert more of a climate warming effect than an otherwise equivalent contrail which forms in slightly warmer air.

In order to best offset any additional fuel burned under the invention, it is proposed that contrail suppression could operate only when a contrail persistence is likely, e.g. according to sensing that ambient air is ice supersaturated (ISS) and/or during the night. However various different sub-sets of all contrails may be selected in order to offer a different balance between the system variables and, accordingly the policy may take into account any one or more of the above-discussed conditions/parameters.

Returning to FIG. 2, 40 is a source or sources of data from which can be measured or calculated the engine's total efficiency at the current conditions. Examples might include sensors for fuel-flow rate into the engine and speed of the aircraft through the surrounding air. Additionally or alternatively, the sensors 24, 26 referred to above could be used in conjunction with fuel-flow rate sensors.

42 is a database, lookup table or computational model from which can be obtained information describing the variation in engine total efficiency due to changes in thrust level. This resource may also take into account the changes in nozzle 12 by actuator 32 and the resulting changes on engine efficiency.

44 is a further database, look-up table or computational model detailing the relationship between throttle setting and thrust level resulting from that throttle setting, given the engine's current operating point, and typically taking account of the changes in nozzle 12 by actuator 32. In the context of the current invention the engine operating point can be interpreted to mean engine total efficiency, η, but more generally it takes account of many parameters such as shaft speeds, pressures and/or temperatures at various points throughout the engine as well as any control settings that affect engine operation, such as bleed settings, power offtake settings etc.

46 represents an engine operation sensor, or a collection of sensors, or one or more other data source from which can be obtained any of the operational variable values required for interrogation of any of the database(s), lookup table(s) or computational model(s) described above including any or any combination of engine settings or operational parameters.

48 represents one or more database of any other predetermined or stored data necessary for performing a determination according to the invention, such as the specific heat capacity of air at constant pressure $C_p$, and the ratio E of the molar masses of water and air, or the like.

50 is a lookup-table, database or computational model from which can be obtained the "cost penalty" of contrail formation given the current ambient and/or engine operation conditions. The cost penalty parameter varies in relation to one or more contrail characteristic and allows a representation of the balance between minimising fuel-burn on the one hand and minimising contrail climate impact on the other hand. If a contrail does not form under a particular set of conditions then the cost penalty calculated for those conditions would take a value of zero. If a non-persistent contrail forms the cost penalty would take a medium value, and if a persistent contrail forms the cost penalty would take a high value. Additional or alternative factors could contribute to the cost penalty, such as for example ambient temperature and/or the time of day (e.g. allowing distinction between contrails existing during daytime and night time). In one example, the cost penalty could additionally or alternatively relate to a financial cost/penalty.

52 represents an optional lookup-table, database or computational model from which can be obtained estimates or detailed calculations of any likely impact upon maintenance cost related to operating an engine at a higher-than normal thrust setting.

20 is the controller, i.e. the decision making unit central to the present invention. The decision making unit 20 comprises one or more controller arranged to operate the decision making processes discussed below in relation to FIGS. 3-5.

The engine 10 draws fuel from a fuel source 54 via a fuel line, under the control of an engine control unit 56. In this example, the controller 20 is shown as being a separate entity to control unit 56 such that the controller 20 is common to a plurality of engines on the aircraft so as to coordinate contrail suppression for the aircraft as a whole. Thus controller 20 is in communication with, and can instruct, each engine either individually or collectively. The local engine control unit 56 on each engine then instructs or controls the level of actuation of the variable area fan nozzle 32, in dependence upon a signal 58 received from the decision making controller 20. In other embodiments, the controller 20 and control unit 56 could be one and the same, for example such that an engine control unit 56 is in communication with other control units for the other engine(s) on the aircraft. Various different configurations of central and/or local control are possible provided the necessary control instructions can be communicated to, and/or implemented for, each engine individually.

The engine control unit 56 also adjusts the engine throttle setting (by modifying the control signal 34) so as to compensate for the loss of thrust attributable to the reduction in engine efficiency associated with the VAFN actuation. In order to achieve this, the engine control unit 56 has access to one or more of the above described resources such as a relevant model, look-up table or database. In particular the engine control unit 56 typically has access to information describing the impact upon thrust of the variable area nozzle 12 actuation level from the resource 42 and/or information from resource 44 relating throttle setting to delivered thrust. Alternatively, the nozzle actuator 32 could have its own dedicated controller which receives instructions from central controller 20 and is in signal communication with the engine control unit 36 so as to allow the engine throttle setting to be altered in dependence upon the nozzle actuation level, again (optionally) using information from the resources 42, 44. In another example, all processing could be performed centrally by controller 20 for all engines on the aircraft, thereby requiring the controllers 56 merely to implement the instructed settings.

Figure 3:
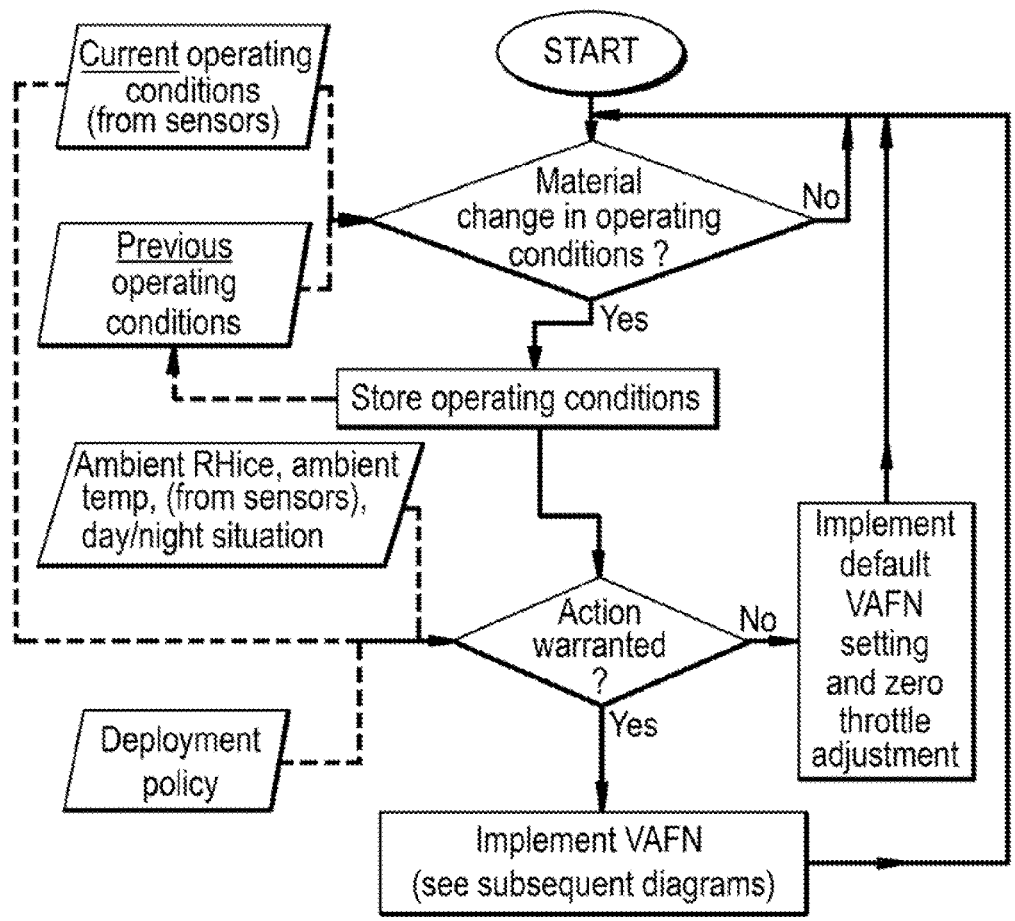
FIG. 3 is a flow diagram of a high level control process according to one example of the invention.

In FIG. 3 there is shown a high level decision-making process for determining whether control steps are required to mitigate against contrail formation. The control system operates a primary loop to check whether the operating conditions (i.e. the ambient conditions and/or engine operation parameters) have changed materially since a previous iteration. The operating conditions could comprise any, or any combination of, ambient temperature, ambient pressure, ambient humidity, altitude, and/or engine throttle setting or engine operating point. Any material change may comprise change of any one or more parameter to an extent that will materially alter a contrail characteristic (or persistence, or occurrence of contrails). This primary loop can be iterated without changing existing settings until a relevant change to operating conditions is determined. Current operating conditions could be stored at each iteration such that the next iteration can compare current operating conditions against one or more recorded set of previous operating conditions. Alternatively, current operating conditions are stored during the first iteration of the primary loop and thereafter only when a material change to the operating conditions is detected relative to the previously stored value. In any example, a log of previous operating conditions is maintained to allow comparison with current or most recently sensed conditions.

The controller then determines, e.g. according to a current usage/deployment policy, whether it is deemed appropriate to use a method for mitigating contrail suppression under the current operating conditions. For instance, it may or may not be considered appropriate to only use this invention when contrails persist, e.g. if ambient relative humidity over ice is 100% or greater. Additionally or alternatively, it may be deemed inappropriate to use the invention if engine operating conditions or external requirements prioritise thrust or another engine parameter to the extent that there is no available scope to apply contrail suppression. Additionally or alternatively, the decision to use or not to use this invention to modify contrail properties may be informed by other factors such as the ambient temperature and/or the strength of incoming sunlight incident upon the formed contrail. For example, it may be deemed appropriate to attempt to suppress the formation only of contrails which are both persistent and existing primarily during the night-time. Such additional decision criteria would avoid the need to suppress contrails that do not bear a significant climate-warming impact. Accordingly it is possible in any example of the invention that an ambient condition sensor could comprise a light sensor.

An assessment of whether or not a particular contrail characteristic that would warrant mitigation steps is undertaken by checking whether one or more ambient sensor reading and/or engine operation parameter achieve a threshold level. In one example, a vapour trail detection sensor 30 may be used to trigger contrail mitigation action and/or to verify a determination of the presence or absence of a contrail.

If there has been no material change in the operating conditions, or a material change in the operating conditions is detected but any of the other conditions described above are not satisfied, then no change to the current contrail suppression control settings are made. If contrail mitigation is determined to no longer be appropriate, then nozzle actuator 32 is controlled to return to a normal (i.e. unactuated) mode and any thrust modifications for contrail suppression are deactivated. If all conditions are satisfied then a control scheme according to the invention is invoked to determine and implement the optimal contrail suppression settings for each engine for the prevailing conditions as will be described below. FIG. 4 shows a first version of a procedure for implementing contrail mitigation settings called from the main control loop of FIG. 3. This first version attempts to determine the required extent of fan nozzle actuation by calculation based on computational models and or lookup-tables/databases, in dependence upon input data taken from various sensors as described herein. This embodiment determines an acceptable threshold value or range for a contrail characteristic, such as a contrail factor and a required change in engine efficiency in order to achieve that threshold contrail characteristic value. The controller then determines whether the available range of actuation of the variable area fan nozzle 12 is sufficient to achieve the required change in engine efficiency. If so, the controller then determines whether the change in throttle required at the reduced engine efficiency setting to achieve the current/required level of thrust is acceptable. If this condition is satisfied then the level of actuation required to achieve the threshold contrail characteristic value is implemented. If any condition is failed, the default/normal nozzle setting (implying no active contrail suppression) and the corresponding engine throttle setting is implemented. The procedure then returns to the main control loop of FIG. 3.

Further to the procedure described above, engine efficiency also depends upon throttle setting and so, once the throttle adjustment has been determined in response to the proposed level of fan nozzle actuation, the efficiency of the engine will typically have changed. This will therefore alter the required level fan nozzle actuation necessary to achieve contrail suppression. An iterative calculation may thus be adopted to identify the minimum actuation level (i.e. the minimal reduction in engine efficiency) that achieves the desired threshold contrail suppression. The iterative process may converge on a final value to be implemented by the controller. Alternatively an analytical solution which requires only one pass of the contrail mitigation calculation procedure may be possible.

FIG. 5 shows a second version of a procedure for implementing contrail mitigation settings called from the main control loop of FIG. 3. This second version adjusts the level of fan nozzle actuation with reference to the signal from a contrail detection sensor 30 which provides an indication of whether or not a contrail is forming. The level of actuation of the variable fan nozzle is iteratively adjusted upwards or downwards until the minimum level of actuation (and hence the minimum fuel-efficiency penalty) that will result in the contrail-suppression threshold is identified. In this example the throttle setting may be continuously adjusted in response to changes in fan nozzle actuation so as to maintain the thrust level commanded from the cockpit. As with the example of FIG. 4, if there is inadequate scope for the necessary throttle modification or else if the maximum actuation of the fan nozzle is insufficient to achieve the threshold contrail characteristic value, then contrail suppression is deemed not possible in the current operating condition and the variable nozzle actuation is returned to its default/normal value and the contrail suppression control system does not modify the throttle and/or thrust demand set by the cockpit.

In the above examples, concurrent throttle modification is necessary to compensate for the loss of efficiency which is intentionally introduced by the present invention. By increasing the throttle setting as the engine's efficiency is degraded, the thrust level is maintained substantially at the level commanded from the cockpit. In any of the above examples, a throttle modification is deemed achievable if it can be implemented without requesting more thrust than the engine can actually/safely deliver in the current operating conditions and with the proposed nozzle actuation setting. However an achievable proposed throttle modification may be deemed unacceptable if it causes another engine operation variable to change beyond a pre-determined acceptability threshold, such as for example a temperature margin (e.g. TGT margin), or rotational speed of one or more shafts being unacceptably high. Additionally or alternatively, a throttle modification may be deemed unacceptable if it results in the engine running at a condition that is known to increase maintenance costs per running-hour by more than some pre-determined threshold.

The procedures described above may be performed once, e.g. in respect of one engine or an 'average' engine, and the resulting setting(s) applied to all engines commonly, e.g. assuming that the level of thrust commanded from the cockpit is the same for all engines. Alternatively, the control system may operate according to an assumption that all the engines on board an aircraft could differ in terms of their efficiencies and operating characteristics. This is for example because each engine will experience different in-service events and maintenance actions over time, or may be of different age and furthermore may be swapped from aircraft to aircraft. Furthermore in some operating conditions/scenarios, for example an engine shut-down event, engines may be requested to provide materially different levels of thrust from each other, e.g. in order to minimise thrust asymmetry.

A preferred example of the invention thus allows co-ordination of the action across the set of engines on the aircraft, whereby the precise concurrent settings for each engine could be varied by the controller. Such a feature can also be used to obtain maximum contrail suppression benefit for minimum additional fuel burn. This is because the invention as described above can accommodate a thrust matching locally for each engine, thereby allowing a range of contrail mitigation actuation values over which the thrust can be kept constant. Thus if a non-linear relationship between throttle and contrail mitigation exists, it may be beneficial to actuate the fan nozzle on one or more engine to a greater extent than on one or more further engine.

Turning back to FIGS. 1 and 2, in any of the above examples, the controller 20, 56 is arranged to control the actuator 32 to vary the cross-sectional area of the variable area fan exhaust nozzle 12 according to sensor signals as described above. Thus a first mode of operation can be defined, in which no actuation of the actuator 32 is undertaken and the nozzle adopts a normal (i.e. an optimum efficiency) configuration. This configuration is shown as position 60A of the actuator 32, which has a radius X3 of the variable area fan exhaust nozzle 12, in FIG. 1. In a second mode of operation, when contrail suppression is required, the actuator is actuated away from the optimal efficiency configuration to cause a controlled loss of efficiency up to a maximum actuation condition 60B, which has a radius X1 of the variable area fan exhaust nozzle 12. However it is important to note that the variable area fan nozzle may be actuated for other purposes during the course of a flight, such as for example for noise reduction and/or to improve fan flutter margin, e.g. at take-off. Thus the actuator 32 may be operated in a third mode of use having a radius X2 of the variable area fan exhaust nozzle 12, for example as described in European Patent Application 09252067.5 (published as EP2184480), in the name of Rolls-Royce plc. The second and third modes of use may be enabled or disabled such that only one mode of use (and its associated control scheme) is implemented at any one time. The distinction between the second and third modes of use may be made based upon one or more ambient or engine operation sensor reading. For example the controller may distinguish between the available modes of use based upon altitude and/or engine throttle setting. The third mode of use may be used at relatively lower altitude (e.g. during take-off, climb and/or descent), whereas the second mode of use may be implemented during cruise, i.e. at altitudes where contrails are more likely to form. In another example, one mode of use may always take precedence over the other, e.g. such that the second mode of use is enabled only when meaningful noise reduction is not required or cannot be achieved. It is also possible that the actuation of the fan nozzle for one aim may passively bring about a benefit that is the aim of the other mode of use without actively trying to do so.

The available range of actuation of the fan nozzle may be the same or different for the second and third modes of use.

The above-described multiple modes of use of the invention are particularly beneficial since they allow a single actuation system to be controlled differently according to different aims, thereby avoiding the need for multiple additional systems for each aim. Thus the invention can achieve potential cost, weight and complexity savings associated with bespoke systems for each functional aim.

Although in the above-described example, the actuator 32 has discrete positions of actuation, it will be appreciated that any flow opening which is actuable according to the invention will typically be variably actuable over the available range of actuation so as to adopt any suitable condition within that range according to the sensed operating/ambient conditions. Accordingly the actuator or flow opening may be range-taking. In one example a plurality of predetermined actuator positions and/or flow opening areas may be defined such that the controller selects one of the predetermined options in use, for example the predetermined option which is closest to an optimal position determined by the controller.

Turning now to FIG. 6, there is shown an assessment of the extent of contrail suppression effect achievable by degrading engine efficiency by 10%. FIG. 6 shows the variation of contrail "critical temperature" (i.e. the ambient air temperature below which a contrail can form for a given level of ambient humidity and engine total efficiency) with altitude, for an engine whose total efficiency of 0.36 is typical of current large civil gas turbines. The pair of parallel diagonal lines 62, 64 shows the critical temperatures for ambient air which is completely dry (relative humidity of 0%). This is representative of conditions in the stratosphere which is where much of a flight's cruising phase takes place (particularly at non-tropical latitudes). If the ambient temperature (shown by the heavy dotted line) is lower than the critical temperature, a contrail can form. The right hand line 62 corresponds to the engine in its unaltered state, while the left line 64 corresponds to the engine at an efficiency which is reduced by (in this case) 10% relative to its unaltered state. The left line 64 corresponds to lower critical temperatures, meaning that ambient air must be colder if a contrail is to form, and thus contrail formation is possible over a slightly reduced range of altitudes.

A mathematical analysis of the implementation of the invention suggests that a 10% degradation of efficiency could reduce the extent of the contrail-formation altitude-band by around 1400-1500 feet, curtailing it for example by about 1130 feet at its upper boundary 66A and around 330 feet at the lower boundary 68A. This difference is due to the fact that, in this case, the upper boundary lies within the stratosphere, while the lower boundary lies within the troposphere. The effect is more pronounced in the stratosphere because the rate of temperature change with altitude, i.e. the lapse rate, there is effectively zero.

The chart of FIG. 6A shows a plot for an International Standard Atmosphere (ISA) temperature profile (sea-level temperature 15° C., tropopause height 11 km), whereas FIG. 6B shows a corresponding chart for an example of a non-ISA profile (sea-level temp 7° C., tropopause height 9 km), again assuming dry ambient air. Accounting for the different scales of the charts in FIGS. 6A and 6B, the magnitude of the contrail suppression effect at upper 66B and lower 68B limits upon the altitude range in which contrails would form is similar to FIG. 6A. It is proposed that it would also be similar for other levels of ambient relative humidity and other temperature profiles. This is because the gradient of the contrail critical-temperature lines is largely independent of ambient humidity, and the lapse rates within the troposphere and stratosphere respectively are not changed materially in other temperature scenarios. The most significant issue is whether a boundary of the contrail-formation altitude-band lies in the troposphere or the stratosphere.

The efficiency reduction during key parts of the cruise would be effected by opening the fan nozzle area and reducing the fan's operating pressure ratio. Since the fan is designed to achieve peak efficiency at the cruise point, reducing the fan's pressure ratio there will reduce the fan system efficiency and thus the overall efficiency of the engine. A key advantage of this approach is that it makes use of equipment that may already be present on the engine, and delivers an additional benefit with that equipment.

An efficiency degradation of around 10%, e.g. in the region of 5% to 20%, may be achievable by way of the invention but this does not provide a universal solution for contrails, in that it diminishes the altitude band within which contrail formation is possible by only around one thousand feet relative to the corresponding altitude band for a conventional engine. Nonetheless, by diminishing the contrail-formation altitude band, the invention creates two new bands of non-contrail-formation, each of a few hundred feet in vertical extent. The present invention is of use if one of those altitude bands of non-contrail formation straddles the aircraft's current altitude or else is so close to the current altitude that it can be achieved without significant detriment. Accordingly it is envisaged that the invention may usefully be employed to provide a partial contrail suppression solution, making use of existing engine systems, due to its low weight penalty. Alternatively the invention may be used in conjunction with one or more further contrail suppression system, for example allowing extra contrail-suppression capability when other methods have reached their own limits. However the usefulness if the invention is likely to improve over time in line with improvements to engine total efficiency due to advances in technology. For example any percentage improvement in engine total efficiency will add a corresponding increase to the scope of potential contrail factor reduction obtainable using the present invention.

Since the invention relies on the deliberate reduction of engine efficiency, it will introduce an increased fuel-burn and hence cost. However this penalty is likely to be less than 10% additional fuel burn when the contrail suppression is active and is incurred only for a small proportion of the flight and so is less severe than it might initially appear to the skilled person. From a climate-change perspective, the reduction in climate warming impact achieved through contrail suppression can be tailored through the control methods discussed above to outweigh the increased $CO_2$ or other exhaust emissions resulting from this invention's operation.

Whilst in the above examples the fan efficiency is degraded by selective opening of the nozzle, in other examples it is also possible to degrade total engine efficiency by selectively reducing/restricting the flow area of the fan bypass annulus (i.e. partially closing the flow opening). Although the relatively limited extent to which fan efficiency can be degraded by closing the nozzle is considered, in itself, to have lesser impact on the total efficiency of the engine, such a mode of operation would additionally reduce the bypass flow rate and also increase the fan pressure ratio, further reducing the engine propulsive efficiency and hence the total efficiency of the engine. Accordingly any actuator or flow opening may be selectively opened or closed relative to a normal usage condition.

In order to accommodate a flow opening which can be selectively reduced in flow area, some additional or alternative control logic may be provided to limit the fan pressure ratio to within a maximum threshold, e.g. so as to avoid surge. The fan pressure ratio can be measured by the ratio of signals from sensors 26 and 24 in FIG. 1. To establish the threshold we would likely take into account factors such as the ambient pressure and/or ambient temperature and/or the aircraft forward speed and/or the mass flow through the fan, enabling us to calculate the semi-non-dimensional mass flow $W*\sqrt{(T/P)}$ as would be understood by the skilled person (where T and P are the stagnation temperature and stagnation pressure respectively at the fan inlet). Using a lookup table, database or other correlation (representative of the fan's "compressor characteristic"), it is possible to identify the fan pressure ratio corresponding to "surge" at that semi-non-dimensional mass flow. Applying a suitable safety margin enables us to identify a threshold value of fan pressure ratio to be implemented by the controller within the framework of the present invention. The surge line could also be defined as a limiting fan pressure ratio versus $N/\sqrt{(T)}$, where N is the rotational speed of the fan (e.g. in revolutions per minute). The threshold would change as the fan speed (and mass flow) adapts to the change in flow area and the throttle adjusts to maintain desired thrust. It may be useful to use fast response instrumentation to detect the approach of surge by detecting high frequency pressure instabilities.

In another example of the invention in which the flow opening is selectively restricted relative to the normal/optimal flow condition, partial closing of the bypass flow area could be implemented by partial activation of an engine thrust reverser, rather than by actuating a variable area fan nozzle. This would have the advantage that the invention could conceivably be applied to a much wider variety of engine types without any significant weight increase by reusing a thrust reverser system for the control aims described herein.

In various examples of the present invention, it is considered pertinent to disable the contrail suppression system during one or more flight phase, such as during take-off, climb and/or approach, where emergency situations may demand that more thrust is commanded quickly, whilst still maintaining engine operation within acceptable TGT and shaft speed limits.

Usage of the contrail suppression system may additionally or alternatively be disabled if the additional volume of fuel required for its operation would jeopardize the safe completion of the flight to the intended destination, taking account also of the requirement to maintain fuel reserves e.g. for holding, diversions and go-arounds. Accordingly, in some examples of the invention, it may be beneficial to calculate or estimate the total amount of fuel required for the flight, taking account of potential/expected contrail suppression requirements. In any such example a proposed flight may be divided into a number of sections, each corresponding to an engine operating condition. For each operating condition, the contrail suppression requirement would be calculated, based on weather forecasts for the ambient conditions to be expected along the flight path over the predicted flight duration, e.g. using a calculation methodology as described above but in a predictive, rather than responsive, sense.

From the contrail suppression prediction for each flight section is determined the amount of fuel necessary to fulfil that contrail suppression requirement for that operating condition, taking account of expected thrust level and duration of the operating condition. A summation over the various operating conditions/flight sections can then be performed to provide the total mass or volume of additional fuel which should be loaded onto the aircraft prior to the flight. A simpler metric could be applied based on flight duration and proposed cruise altitude.

Any such calculation can be performed by a ground based fuel delivery system. It may also be necessary to monitor fuel burn against a predicted fuel burn for the flight or each section thereof to ensure that there is at all times sufficient fuel remaining to complete the flight whilst maintaining the necessary reserves as described above. Accordingly, a minimum fuel threshold profile, below which contrail suppression cannot be implemented for the flight or a particular section thereof may be determined in advance and/or monitored dynamically in flight.

The present invention may focus particularly on the avoidance of contrail formation in regions of ice-supersaturated (ISS) air. However, on average, aircraft spend only a small proportion of their flight-time in ISS air, and so the proportion of the flight during which a contrail suppression mechanism needs to be active in order to mitigate against a majority of the negative climate impact of contrail formation is relatively small. Thus, instead of attempting to suppress all contrails to some level, the invention focuses on the careful identification of specific periods only in which a reduction in engine efficiency to suppress contrail formation can bring about a net positive climate impact beyond what would be achieved using conventional engine control. Furthermore, the contrail-suppression capability by modifying the efficiency of engine operation is fairly limited in scope (i.e. it can cause only a small change in contrail factor) and so it is proposed to modify engine efficiency under the invention only situations in which a relatively small variation in contrail factor would be sufficient to actually suppress contrail formation.

Averaged across aviation as a whole, it has been found that aircraft spend (very approximately) in the region of 15% of flight time in ice-supersaturated (ISS) air. This, when viewed in conjunction with the dominance of persistent contrails in the overall climate impact of AIC, means that there is therefore an opportunity to exert a significant influence over contrail-related warming through interventions carried out over a relatively small proportion of aircraft flight time.

The invention claimed is:

1. A method of controlling one or more gas turbine engine of an aircraft, the method comprising:
   sensing a condition indicative of vapour trail formation by an exhaust flow from the engine using one or more sensor;
   controlling actuation of a flow opening for a propulsive fan of the engine so as to reduce an efficiency of the engine upon sensing of a condition by the one or more sensor;
   altering, by a controller, one or more further operational variable of the engine in order to maintain a desired level of thrust whilst the engine efficiency is reduced;
   determining, by the controller, a maximum available change to the further operational variable under current operating conditions and a corresponding minimum engine efficiency achievable; and
   reducing, by the controller, engine efficiency only if the minimum engine efficiency is determined to prevent contrail formation.

2. The method of controlling one or more gas turbine engine of the aircraft according to claim 1, wherein upon sensing of the condition by the one or more sensor, the actuable flow opening is controlled in order to alter a fan pressure ratio and/or an engine bypass ratio.

3. The method of controlling one or more gas turbine engine of the aircraft according to claim 1, wherein the flow opening includes one or more actuable member, an orientation of the actuable member is controlled in order to control the flow through the flow opening.

4. The method of controlling one or more gas turbine engine of the aircraft according to claim 1, wherein the further operational variable includes a throttle setting for the engine.

5. The method of controlling one or more gas turbine engine of the aircraft according to claim 1, wherein the engine further comprises an ambient air condition sensor, such as temperature, pressure, light and/or humidity sensor.

6. The method of controlling one or more gas turbine engine of the aircraft according to claim 5, wherein the controller is arranged to suppress contrail formation only when the ambient air condition sensor indicates an ambient air is supersaturated with respect to ice and/or when ambient light is below a predetermined threshold level.

7. The method of controlling one or more gas turbine engine of the aircraft according to claim 1, wherein:
   the engine further comprises an altitude sensor, and
   the method further comprises reducing engine efficiency, by the controller, only at an altitude above a predetermined threshold and/or within a predetermined altitude range.

8. The method of controlling one or more gas turbine engine of the aircraft according to claim 1, wherein the one or more sensor includes a receiver that receives an electromagnetic or acoustic reflection and/or emission from a contrail downstream of the engine.

9. A method of controlling one or more gas turbine engine of an aircraft, the method comprising:
   sensing a condition indicative of vapour trail formation by an exhaust flow from the engine using one or more sensor;
   controlling actuation of a flow opening for a propulsive fan of the engine so as to reduce an efficiency of the engine upon sensing of a condition by the one or more sensor;
   outputting, by a fuel sensor, a reading of a volume of fuel available to the engine for combustion; and
   controlling or inhibiting, by a controller, the reduction of the efficiency of the engine based upon the reading output by the fuel sensor.

* * * * *